United States Patent [19]

Famili et al.

[11] Patent Number: 5,362,778
[45] Date of Patent: Nov. 8, 1994

[54] EXTRUDABLE POLYVINYL ALCOHOL COMPOSITIONS CONTAINING MODIFIED STARCHES

[75] Inventors: Amir Famili, Orefield; James F. Nangeroni, Allentown; Finn L. Marten, Macungie, all of Pa.

[73] Assignee: Air Products and Chemicals, Inc., Allentown, Pa.

[21] Appl. No.: 17,932

[22] Filed: Feb. 16, 1993

[51] Int. Cl.$^5$ .................. C08L 89/00; B29C 65/00; D01F 6/14
[52] U.S. Cl. .................. 524/50; 264/40.6; 264/185; 264/211.21; 264/211.22; 264/211.23
[58] Field of Search .................. 524/47, 50; 264/40.6, 264/185, 211.21, 211.22, 211.23

[56] References Cited

U.S. PATENT DOCUMENTS

| | | | |
|---|---|---|---|
| 2,340,866 | 2/1944 | Dangelmajer | 524/52 |
| 3,312,641 | 4/1967 | Young | 524/47 |
| 5,051,222 | 9/1991 | Marten et al. | 264/143 |
| 5,095,054 | 3/1992 | Lay et al. | 524/47 |

*Primary Examiner*—Nathan M. Nutter
*Attorney, Agent, or Firm*—Michael Leach; William F. Marsh

[57] ABSTRACT

An extrudable polyvinyl alcohol composition useful for packaging and molding applications is prepared by melt blending polyvinyl alcohol and thermoplastic modified starch to provide a product which has reduced water sensitivity, improved modulus and reduced elongation at high relative humidity.

A method for extruding the polyvinyl alcohol composition comprises:

adding sufficient energy to the polyvinyl alcohol composition to both melt it and essentially eliminate the polyvinyl alcohol crystallinity in the melt, and simultaneously removing energy from the melt at a rate sufficient to avoid decomposition of the polyvinyl alcohol.

The thermoplastic modified starch may be added to the polyvinyl alcohol before or during the melting of the polyvinyl alcohol and elimination of its crystallinity, or the starch may be blended with the thus treated polyvinyl alcohol and then melt extruding the polyvinyl alcohol/starch blend.

19 Claims, No Drawings

5,362,778

EXTRUDABLE POLYVINYL ALCOHOL COMPOSITIONS CONTAINING MODIFIED STARCHES

FIELD OF THE INVENTION

The present invention relates to melt extrudable polyvinyl alcohol compositions which have desirable physical properties.

BACKGROUND OF THE INVENTION

Polyvinyl alcohol (PVOH) is a water soluble, repulpable and biodegradable resin with excellent aroma and oxygen barrier properties and resistance to most organic solvents. Other desirable attributes of PVOH include anti-static properties, grease and oil resistance and heat sealability. The polymer is used extensively in adhesive, textile sizing and paper coatings. However, the end uses of PVOH have been limited despite its excellent chemical, mechanical and physical properties to those uses in which it is supplied as a solution in water. This limitation is partly due to the fact that vinyl alcohol polymers in the unplasticized state have a high degree of crystallinity and show little or no thermoplasticity before the occurrence of decomposition which starts at about 170° C. and becomes pronounced at 200° C., which is below its crystalline melting point.

With the present public concern for preserving the environment, it has been found desirable to search for materials which, when disposed after use, will physically or biologically decompose and thereby avoid polluting the environment. One candidate for such a material is water-soluble PVOH.

U.S. Pat. No. 5,051,222 discloses a method for making thermoplastic (melt extrudable) PVOH compositions which comprises providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH. The melt is then extruded, preferably into a strand, rapidly cooled and cut into pellets for subsequent thermoprocessing into the desired product or article.

As a result of the availability of such thermoplastic PVOH compositions, the desirable physical and mechanical properties of PVOH such as biodegradability, water solubility and repulpability have opened new market opportunities for PVOH, especially in packaging applications where the contents must be dissolved or dispersed in water. Examples of such packaging applications for PVOH film include pesticides which are applied as a water spray, caustic cleaners or detergents which are dissolved during use, and process chemicals such as pigments, dyes or carbon black which are dissolved or dispersed in water. The advantages of using a water soluble film for packaging the above materials include the elimination of both human exposure to highly toxic or concentrated chemicals and the need to clean and discard contaminated chemical containers after use.

PVOH films can also be used to control contamination in hospitals. Soiled laundry can be collected and placed directly into a PVOH bag. The bag is then placed into the washing machine where the bag dissolves completely.

Examples for molding applications include disposable sanitary products such as tampon insertion tubes or vials for solvent based chemicals.

U.S. Pat. No.5,095,054 discloses a thermoplastic polymer composition comprising a destructured starch and a thermoplastic polymer.

SUMMARY OF THE INVENTION

The present invention provides a PVOH composition containing a modified starch which composition is readily melt extrudable and provides extruded articles demonstrating reduced moisture sensitivity. For purposes of this invention "modified starch" means hydroxypropylated starches thermally stable to extrusion temperatures.

The extrudable PVOH/starch composition consists essentially of:

a) 5 to 95 wt % thermoplastic PVOH,
b) 5 to 95 wt % thermoplastic modified starch, and
c) 1 to 30 wt % plasticizer, based on PVOH.

Also provided is a process for the production of such extrudable PVOH/starch compositions in the form of essentially gel-free thermoplastic pellets useful for conventional thermoplastic processing.

The extrudable PVOH/starch composition is obtained by mixing the thermoplastic PVOH with the modified starch and reel t extruding the mixture, preferably into pellets for subsequent thermoprocessing into the desired product or article.

If the modified starch is initially blended with a PVOH which has not been made thermoplastic, a melt extrudable composition of the PVOH/starch blend is obtained by providing sufficient energy to the PVOH/starch blend both to melt the PVOH and the starch and to substantially eliminate the PVOH crystallinity in the melt while simultaneously removing energy from the PVOH/starch melt at a rate sufficient to avoid decomposition of the PVOH. The melt is then processed directly into the desired product or article, or extruded into a strand, rapidly cooled and cut into pellets for subsequent thermoprocessing.

The PVOH/starch pellets produced are thermally stable and can withstand subsequent melt processing in conventional thermoplastic processing equipment, for example, a single screw extruder. The pellets can be thermoplastically processed (extruded) into essentially gel-free articles without decomposition because the equipment only has to melt the pellets (PVOH crystallinity having been greatly reduced) and generate sufficient pressure for the desired forming operation. These operations include, by way of example, injection molding, profile extrusion, thermoforming, injection blow molding, and tubular film blowing, all well-known in the art. The PVOH/starch composition is especially suitable for the production of water soluble containers. These containers can be produced by injection molding, blow molding, or profile extrusion, i.e. molding processes well-known in the art.

In addition, the PVOH/starch composition can be used as a layer or layers in combination with other polymeric layers in multi-layer films. For example, the PVOH/starch blend can be co-extruded with one or more layers of polyolefin such as polyethylene. These multi-layer structures are suitable for packaging applications. The manufacture of such multi-layer structures, in particular films, is well-known in the art.

DETAILED DESCRIPTION OF THE INVENTION

Suitable PVOH's for use in the preparation of the extrudable PVOH/starch composition and thermoplastic pellets include PVOH which is 75–99+ mole % 4 hydrolyzed, preferably 85–98+ mole % 4 hydrolyzed, and possesses a degree of polymerization (DPn) in the range of 200 to 2500, i.e., solution viscosities of 3 to 55 cps at 20° C. as a 4% aqueous solution. Copolymers of vinyl alcohol and methyl methacrylate consisting of 94–98 mole % vinyl alcohol and 2–6 wt % methyl methacrylate as disclosed in U.S. Pat. No. 3,689,469 are considered suitable equivalents to the vinyl alcohol and vinyl acetate copolymer containing the same mole % acetate units. The PVOH may also contain up to 3–5 mole % of a copolymerized monomer.

The PVOH component of the PVOH/starch composition preferably comprises 50 to 95 wt %, most desirably 75 to 90 wt %.

The modified starches suitable for use in the present invention are those hydroxypropylated starches having sufficient thermal stability to be melt blended with the melt extrudable PVOH, i.e., melt extrusion stability under the conditions used to melt extrude the PVOH. The preferred starches as 5% aqueous solutions desirably demonstrate a solution viscosity of 2500 to 10,000 cps, Brookfield viscometer, 75° F. (24° C.), 20 rpm, using No. 4 spindle or as 10% aqueous solutions desirably demonstrate a solution viscosity of 400 to 2000 cps, Brookfield viscometer, 75° F. (24° C.), 20 rpm, using No. 4 spindle. Methods for making hydroxypropylated starches are taught in many patent documents including U.S. Pat. Nos. 3,705,891; 3,725,386 and 4,452,978 which disclosures are incorporated by reference. Suitable modified starches are available from A. E. Staley Mfg. Co. under the trademarks Hamaco and Mira-Cleer. It is preferred to use about 5 to 50 wt % and most desirably 10 to 25 wt % of the modified starch.

A plasticizer is used to improve the flow characteristics of the PVOH. The preferred plasticizers are those that have multiple hydroxyl functionality, i.e. polyols such as glycerol. The amount of the plasticizer or blends of plasticizers added to the composition ranges from 1 to 30 wt %, preferably 3 to 20 wt %, and most preferably 5 to 15 wt %, based on PVOH.

The thermal stability of the PVOH can further be improved through the addition of small amounts of a mineral acid, preferably phosphoric acid, to a high intensity mixer in which PVOH and plasticizer may be blended prior to extrusion.

The PVOH should either be low in residual ash (sodium acetate measured as $Na_2O$) or treated with the neutralizing mineral acid.

Optionally, but advantageously, a dispersing agent such as glycerol mono-oleate (GMO) is added during the mixing operation. The preferred range of GMO or other dispersing agents added during the high intensity mixing is 0.05 wt % to 1.0 wt %, or more preferred 0.1 to 0.5 wt %.

In addition, it will be understood that various additives such as fillers, pigments, stabilizers, other thermoplastic resins and the like may be added to the PVOH/starch composition of this invention without departing from its scope.

U.S. Pat. No. 5,051,222, which is hereby incorporated by reference, teaches a method for making melt extrudable (thermoplastic) PVOH compositions suitable for use in the present invention. The method comprises providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH melt. The melt is then extruded, preferably into a strand, rapidly cooled and cut into pellets. Such thermoplastic pellets are marketed by Air Products and Chemicals, Inc. under the trademark VINEX.

In the following description of the process for making a melt extrudable PVOH/starch composition according to the invention, it will be understood that any reference to PVOH in preparing melt extrudable PVOH pellets (according to U.S. Pat. No. 5,051,222) for melt blending with the modified starch would also apply to the direct preparation of the melt extrudable PVOH/starch blend.

The PVOH/starch compositions are prepared either directly by melt blending a PVOH composition containing plasticizer with a modified starch in a high intensity extruder similarly to U.S. Pat. No. 5,051,222 or indirectly by first preparing melt extruded pellets of the plasticized PVOH blend in a suitable high intensity extruder according to U.S. Pat. No. 5,051,222, and then melt blending with the starch to make pellets of the PVOH/starch composition which then may be converted to the desired extruded article by an appropriate extruder.

The extruder used in the melt compounding of the PVOH, plasticizer, and optionally modified starch, must be able to provide an energy input of at least about 0.27 KW hr/kg, preferably 0.35–0.45 Kw hr/kg, to the PVOH. Since the modified starch acts as a filler, it has no effect on the melting energy requirements and minimal changes in the process conditions for PVOH are necessary. The energy input for melting the PVOH may be heat or mechanical energy but with most suitable extruders will be all mechanical energy as will be the shearing energy.

The upper, practical limit of energy input would be about 0.6 KW hr/kg because any energy beyond that necessary to melt the PVOH and to eliminate PVOH crystallinity must be removed as "waste energy". The more energy that passes through the PVOH and has to be removed the more inefficient the process. Approximately 0.1 to 0.15 KW hr/kg is required to melt (and heat) the PVOH and about 0.2 to 0.3 KW hr/kg is needed to shear the crystalline PVOH areas in the melt.

Further, the extruder must be capable of removing the excess energy input not required in the heating, melting and shearing of the PVOH resin. The excess energy is removed through the extruder barrel, extruder screw, or through the evaporation of plasticizer during the devolatilization step. Examples of suitable commercially available extruders include Werner and Pfleiderer twin screw extruders and kneader-extruders such as the Buss kneaders.

The first step in a preferred method (indirect) for making extrudable PVOH/starch compositions involves the preparation of PVOH blended with a dispersing agent to produce a granular, free flowing mixture to be fed into a melt compounding extruder. The blend is prepared using a variable speed high intensity mixer equipped with a cooling jacket. PVOH is charged to the mixer and the temperature is allowed to rise to approximately 55° C. before the GMO is added to the mixing vessel. Next the liquid plasticizer (glycerol) is injected into the mixing chamber under pressure through a spray nozzle once 70° C. is reached. The nozzle serves to atomize the plasticizer and eliminates lumping of the PVOH. During the addition of the plasticizer, both the cooling jacket temperature and the mixer speed are adjusted to maintain the temperature of the mix below 105° C., preferably near 95° C. Advantageously, the required amount of mineral acid, preferably phosphoric acid, is mixed with the plasticizer in a liquid blend.

Other solid or liquid additives, pigments, fillers or stabilizers can be added once the plasticizer addition is complete. The mixing action is continued until a free flowing homogeneous product is achieved. This is generally 4–10 minutes but can vary depending upon the addition rate of the glycerol and the Tg of the PVOH polymer. After a free flowing mix is produced, it is discharged into a cooling blender and the temperature reduced to 30° C. The product is ready for extrusion compounding.

Rather than performing a premixing step, it is more desirable to directly inject the plasticizer (glycerol), mineral acid ($H_3PO_4$) and dispersing agent (glycerol mono-oleate) into the extruder at about the 3 diameter distance downstream from the feed location using the first diameters to heat up the PVOH. Thus, the additives are blended into the PVOH which is then quickly melted, sheared and extruded, avoiding a more prolonged exposure to high heat in a premixer.

The preferred extruder is capable of achieving a high level of mechanical energy input, uniformly distributed throughout the polymer. The mechanical energy input of the screw extruder can be quantified by measuring the specific energy. The specific energy input of a screw extruder is computed from the ratio of the electrical energy, in kilowatts (KW), of the screw mechanical drive to the throughput rate of the polymer (kg/hr). The preferred specific, or mechanical, energy input for the preparation of a homogeneous PVOH melt is greater than about 0.30 KW hr/kg. The extruder must also have cooling capabilities, most preferably jacketing in the barrel sections for heat transfer oil or water. The preferred temperature profile of the PVOH obtained in the different extruder zones is 150°–230° C. depending upon the grade of PVOH, most preferred 170°–220° C. Temperatures less than this result in the appearance of unmelted particles in the strands from the extruder outlet, while temperatures above this range increase the number of gels in the strand and promote degradation of the polymer at the barrel walls.

The thermoplastic PVOH pellets can be melt blended with the thermoplastic modified starch in a conventional single or twin screw extruder.

The PVOH/starch compositions of the present invention in the following examples were prepared either directly by melt blending a PVOH composition containing plasticizer and phosphoric acid with modified starch in a 46 mm reciprocating, rotating Buss kneader or indirectly by first preparing pellets of the melt extrudable PVOH blend containing the plasticizer and phosphoric acid in a suitable extruder and then melt blending the thermoplastic pellets with the starch in single or twin screw extruders. The pellets of the PVOH/starch composition were then converted to a single layer film by a single screw extruder equipped with a 1.5 inch (3.81 cm) blown film die. The temperatures along the barrel varied from 205° to 240° C. The extruded films which were clear or slightly hazy and nearly gel-free, were tested for various physical and mechanical properties.

The pellets of the present invention were also injection molded to tensile and Izod bars using a Boy 50 ton injection molding machine equipped with a standard ASTM test part mold. These bars were then tested for various physical and mechanical properties.

In the following examples all parts are parts by weight.

EXAMPLE 1

The following compositions (Blends A–C) were blended in a high intensity blender. The dry PVOH was first loaded into the mixer. When the material temperature was approximately 55° C. the glycerol mono-oleate (GMO) was added. At this time, the glycerol and phosphoric acid mixture was slowly added to the system. Next, the starch was added to the blend and finally the $TiO_2$ and $CaCO_3$. The water jacket temperature was controlled manually to maintain the temperature of the blend below 100° C.

TABLE 1A

| Component | Blend A | Blend B | Blend C |
|---|---|---|---|
| Airvol 205 PVOH | 20.7 | 20.7 | 20.7 |
| Airvol 203 PVOH | 20.7 | 20.7 | 20.7 |
| Phosphoric Acid | 0.4 | 0.4 | 0.4 |
| Glycerol | 12.0 | 12.0 | 12.0 |
| GMO | 1.0 | 1.0 | 1.0 |
| Calcium Carbonate | 31.0 | 31.0 | 31.0 |
| Titanium Dioxide | 4.0 | 4.0 | 4.0 |
| Hamaco 277 Starch[a] | 10.3 | 0 | 0 |
| Mira-Cleer 187 Starch[b] | 0 | 10.3 | 0 |
| Mira-Cleer 340 Starch[c] | 0 | 0 | 10.3 |

[a]Viscosity 700–1000 cps @10% solids, Brookfield Viscometer, 75° F. (20° C.), 20 rpm, using No. 4 spindle.
[b]Viscosity 100 cps (max) of uncooked starch slurry @77° F. (25° C.), Brookfield Viscometer.
[c]Viscosity 100 cps (max) of uncooked starch slurry @77° F. (25° C.), Brookfield Viscometer.

Blends A–C were pelletized in a conical twin screw extruder under the following conditions. The extruded strands were cooled on a chilled roll and chopped into pellets.

TABLE 1B

| Run | 1 | 2 | 3 |
|---|---|---|---|
| Blend | A | B | C |
| Zone 1 Temperature (°C.) | 190 | 190 | 190 |
| Zone 2 Temperature (°C.) | 210 | 205 | 205 |
| Zone 3 Temperature (°C.) | 130 | 130 | 130 |
| Die Temperature (°C.) | 130 | 130 | 130 |
| Melt Temperature (°C.) | 136 | 136 | 136 |
| Screw Speed (RPM) | 285 | 285 | 285 |
| Screw Torque (m-grams) | 2300 | 1800 | 2200 |
| Comments | Excellent strand, stiff | Excellent strand, stiff | Excellent strand, stiff |

EXAMPLE 2

Various VINEX ™ thermoplastic PVOH compositions prepared according to U.S. Pat. No. 5,051,222 were fed into the feed throat of a Buss 46 mm kneader extruder 11 diameters long. The VINEX compositions contain PVOHs representing two molecular weights (degree of polymerization "DPn") and two degrees of hydrolysis, glycerol ("GLY") and polyethylene glycol 600 ("PEG") as shown below.

| VINEX | DPn[a] | Mole % Hydr | GLY[b] | PEG[b] |
|---|---|---|---|---|
| 2025 | 550 | 87 | 11 | — |

| VINEX | DPn[a] | Mole % Hydr | GLY[b] | PEG[b] |
|---|---|---|---|---|
| 2144 | 900 | 87 | 13.5 | 4.5 |
| 1003 | 900 | 98 | 18 | — |

[a]DPn—degree of polymerization
[b]PHR—parts per hundred parts resin composition Modified starch (Hamaco 277) was fed into a downstream opening in the extruder located 3 diameters down the barrel. Despite the presence of liquid plasticizers in the VINEX compositions, additional glycerol was also pumped into a location one diameter downstream from the feed location of the starch. A gear pump discharge into a 6 hole strand die was used to shape the strands and control the back pressure on the extruder. The strands were cooled by passing over a series of water chilled rolls and then were cut into pellets for subsequent processing.

TABLE 2

| Run | 4 | 5 | 6 | 7 | 8 | 9 | 10 | 11 |
|---|---|---|---|---|---|---|---|---|
| Vinex 2025 | 100 | 100 | — | — | — | — | — | 100 |
| Vinex 2144 | — | — | 100 | 100 | 100 | — | — | — |
| Vinex 1003 | — | — | — | — | — | 100 | 100 | — |
| Starch | 10 | 50 | 10 | 25 | 50 | 10 | 50 | 10 |
| PEG-600 | — | — | 4.5 | 4.5 | 4.5 | — | — | — |
| Glycerol | 19 | 25 | 15.5 | 18.1 | 22.5 | 20 | 27 | 11 |
| Screw (°C.) | 170 | 166 | 166 | 165 | 165 | 142 | 154 | 174 |
| Barrel Zone 1 (°C.) | 169 | 165 | 170 | 170 | 170 | 130 | 156 | 179 |
| Barrel Zone 2 (°C.) | 170 | 150 | 160 | 155 | 155 | 130 | 145 | 163 |
| Melt Pump (°C.) | 195 | 161 | 175 | 170 | 170 | 196 | 194 | 168 |
| Die (°C.) | 190 | 163 | 183 | 175 | 175 | 200 | 200 | 180 |
| Melt (°C.) | 197 | 184 | 205 | 200 | — | 206 | 204 | 190 |
| Screw Speed (RPM) | 200 | 200 | 200 | 200 | 200 | 304 | 304 | 200 |
| Motor Load (KW) | 4.8 | 4.75 | 6.5 | 6.5 | — | 8.7 | 8.0 | 6.2 |
| Die Pressure (KPa) | 2517 | 3792 | 4137 | 4482 | — | 3034 | 2861 | 4450 |

EXAMPLE 3

This example shows four of the melt extrudable PVOH/starch pellets (Runs 6-9) from Example 2 were extruded into a thin film by using a 1" (2.54 cm) Killion single screw extruder and a tubular blown film die. The extruder screw was a 24:1 L/D with 3:1 compression ratio screw.

TABLE 3

| Run | 12 | 13 | 14 | 15 |
|---|---|---|---|---|
| Pellets (Run) | 6 | 7 | 8 | 9 |
| Zone 1 (°C.) | 205 | 200 | 215 | 215 |
| Zone 2 (°C.) | 230 | 220 | 235 | 230 |
| Zone 3 (°C.) | 205 | 200 | 235 | 205 |
| Die Zone 1 (°C.) | 210 | 205 | 220 | 205 |
| Die Zone 2 (°C.) | 205 | 205 | 205 | 200 |
| Screw Speed (RPM) | 80 | 90 | 60 | 80 |
| Drive (AMPS) | 14.5 | 15 | 16 | 14.5 |
| Die Pressure (KPa) | 14,617 | 15,375 | 7,860 | 11,790 |

The films of Runs 12-15 were clear and free of gels. These films also showed less moisture sensitivity compared to standard Vinex resin films.

EXAMPLE 4

The melt extrudable PVOH/starch pellets from Runs 6, 7 and 8 of Example 2 were also injection molded in a Boy 50 ton injection molding machine. Molding temperatures ranged from 180° to 200° C. ASTM tensile bars from the molding were tested per ASTM D638-86. All samples were conditioned at 23° C. and 50% relative humidity for 83 days. The results are tabulated in Table 4.

TABLE 4

| Run | 16 | 17 | 18 |
|---|---|---|---|
| Pellets (Run) | 6 | 7 | 8 |
| Modulus, KPa | 39,783 | 40,265 | 35,991 |
| Elongation, % (yield) | 340 | 415 | 382 |
| Tensile Stress, KPa (yield) | 19,170 | 18,750 | 17,380 |
| Elongation, % (break) | 362 | 464 | 428 |
| Tensile Stress, KPa (break) | 17,580 | 18,400 | 16,480 |

The blends of PVOH/starch retained the properties of extruded Vinex PVOH and showed no signs of degradation.

EXAMPLE 5

In this example Vinex 2025 PVOH resin and Run 11 blend (Vinex 2025 PVOH/Hamoco 277 starch; 90/10) were tested for the rate of water pickup at 84.7% Relative Humidity/22° C. for 18 days. The Vinex 2025 resin had a 15.7% weight gain while the Run 11 blend only had a 8% weight gain. Thus, the PVOH/starch blend showed reduced sensitivity to moisture. STATEMENT OF INDUSTRIAL APPLICATION The present invention provides an extrudable polyvinyl alcohol/starch composition useful for packaging applications.

We claim:

1. In a melt extrudable polyvinyl alcohol composition consisting essentially of polyvinyl alcohol and 1-30 wt % plasticizer, based on polyvinyl alcohol, which has been made melt extrudable by adding sufficient energy to the polyvinyl alcohol to both melt it and substantially eliminate the crystallinity in the melt while simultaneously removing energy from the melt at a rate sufficient to avoid decomposition of the polyvinyl alcohol, wherein the improvement comprises 5-95 wt % thermoplastic hydroxypropylated starch, based on polyvinyl alcohol and starch in the composition.

2. The composition of claim 1 in which the starch as a 5% aqueous solution has a viscosity of 2500-10,000 cps, Brookfield Viscometer, 75° F. (24° C.), 20 rpm, using No. 4 spindle.

3. The composition of claim 1 in which the starch as a 10% aqueous solution has a viscosity of 400-2000 cps, Brookfield Viscometer, 75° F. (24° C.), 20 rpm, using No. 4 spindle.

4. The composition of claim 1 which comprises 5-50 wt % thermoplastic hydroxypropylated starch.

5. The composition of claim 1 which comprises 10-25 wt % thermoplastic hydroxypropylated starch.

6. In a melt extrudable polyvinyl alcohol composition consisting essentially of 75-99+ mole % hydrolyzed polyvinyl alcohol and 3-20 wt % plasticizer, based on polyvinyl alcohol, which has been made melt extrudable by adding about 0.3 to 0.6 KW hr/kg to the polyvinyl alcohol to both melt it and substantially eliminate the crystallinity in the melt while simultaneously removing energy from the melt at a rate sufficient to avoid decomposition of the polyvinyl alcohol, wherein the improvement comprises 5-95 wt % thermoplastic hydroxypropylated starch, based on polyvinyl alcohol and starch in the composition, the starch as a 5% aqueous solution having a viscosity of 2500-10,000 cps, Brookfield Viscometer, 75° F. (24° C.), 20 rpm, using No. 4 spindle or as a 10% aqueous solution having a viscosity of 400-2000 cps, Brookfield Viscometer, 75° F. (24° C.), 20 rpm, using No. 4 spindle.

7. The composition of claim 6 which comprises 5-50 wt % thermoplastic starch.

8. The composition of claim 6 which comprises 10-25 wt % thermoplastic starch.

9. The composition of claim 6 in which the starch as a 5% aqueous solution has a viscosity of 5000-6500 cps, Brookfield Viscometer, 75° F. (24° C.), 20 rpm, using No. 4 spindle.

10. The composition of claim 6 in which the starch as a 10% aqueous solution has a viscosity of 400-2000 cps, Brookfield Viscometer, 75° F. (24° C.), 20 rpm, using No. 4 spindle.

11. In a melt extrudable polyvinyl alcohol composition consisting essentially of 85-98+ mole % hydrolyzed polyvinyl alcohol and 5-50 wt % plasticizer, based on polyvinyl alcohol, which has been made melt extrudable by adding about 0.35 to 0.45 KW hr/kg to the polyvinyl alcohol to both melt it and substantially eliminate the crystallinity in the melt while simultaneously removing energy from the melt at a rate sufficient to avoid decomposition of the polyvinyl alcohol, wherein the improvement comprises 5-50 wt % thermoplastic hydroxypropylated starch, based on polyvinyl alcohol and starch in the composition, the starch as a 5% aqueous solution having a viscosity of 5000-6500 cps, Brookfield Viscometer, 75° F. (24° C.), 20 rpm, using No. 4 spindle or as a 10% aqueous solution having a viscosity of 700-1000 cps, Brookfield Viscometer, 75° F. (24° C.), 20 rpm, using No. 4 spindle.

12. In a method for making a melt extruded polyvinyl alcohol article which comprises (a) adding sufficient energy to a mixture of a plasticizer and a polyvinyl alcohol which is at least partially crystalline to both melt the polyvinyl alcohol and substantially eliminate the polyvinyl alcohol crystallinity in the melt, (b) simultaneously removing energy from the melt at a rate sufficient to avoid decomposition of the polyvinyl alcohol, and (c) extruding the mixture to form an article, the improvement which comprises adding a thermoplastic hydroxypropylated starch to the polyvinyl alcohol/plasticizer mixture.

13. The method of claim 12 in which the modified starch is added to the polyvinyl alcohol/plasticizer mixture prior to step (a).

14. The method of claim 12 in which the modified starch is added to the polyvinyl alcohol/plasticizer mixture during step (a).

15. The method of claim 12 in which the modified starch is added to the polyvinyl alcohol/plasticizer mixture after step (b).

16. In a method for making a melt extruded polyvinyl alcohol article which comprises (a) adding 0.27 to 0.6 KW hr/kg to a mixture of a plasticizer and a 85-99+ mole % hydrolyzed polyvinyl alcohol which is at least partially crystalline to both melt the polyvinyl alcohol and substantially eliminate the polyvinyl alcohol crystallinity in the melt, (b) simultaneously removing energy from the melt at a rate sufficient to avoid decomposition of the polyvinyl alcohol, and (c) extruding the mixture to form an article, the improvement which comprises adding a thermoplastic hydroxypropylated starch.

17. The method of claim 16 in which the starch is added to the polyvinyl alcohol/plasticizer mixture prior to step (a).

18. The method of claim 16 in which the starch is added to the polyvinyl alcohol/plasticizer mixture during step (a).

19. The method of claim 16 in which the modified starch is added to the polyvinyl alcohol/plasticizer mixture after step (b).

* * * * *